US009137049B2

(12) United States Patent
Varoglu et al.

(10) Patent No.: US 9,137,049 B2
(45) Date of Patent: Sep. 15, 2015

(54) DYNAMICALLY OVERRIDING ALERT SUPPRESSIONS BASED ON PRIOR ACTIONS

(71) Applicant: Apple Inc., Cupertino, CA (US)

(72) Inventors: Devrim Varoglu, Santa Clara, CA (US); Sarin S Mehta, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/780,723

(22) Filed: Feb. 28, 2013

(65) Prior Publication Data

US 2014/0241517 A1    Aug. 28, 2014

(51) Int. Cl.
*H04M 3/42* (2006.01)
*H04L 12/58* (2006.01)
*H04M 1/00* (2006.01)

(52) U.S. Cl.
CPC .............. *H04L 12/587* (2013.01); *H04L 51/24* (2013.01)

(58) Field of Classification Search
CPC . H04M 1/663; H04M 1/72519; H04M 19/04; H04M 3/436; H04M 1/72547; H04M 19/041; H04M 19/045; H04M 3/02; H04M 1/57; H04M 17/72552; H04M 1/72569; H04M 15/771; H04M 19/047
USPC ............... 379/373, 374, 375.01, 376, 210.03, 379/210.02, 207.16, 201.1, 257; 370/352, 370/353, 354, 355, 356, 357; 455/456.4, 455/567, 566; 715/753, 728, 739, 747, 811
See application file for complete search history.

(56) References Cited

U.S. PATENT DOCUMENTS

| | | | |
|---|---|---|---|
| 8,233,943 B1 * | 7/2012 | Othmer et al. ................ | 455/567 |
| 8,532,627 B1 * | 9/2013 | Nassimi ..................... | 455/412.2 |
| 2002/0119788 A1 * | 8/2002 | Parupudi et al. .............. | 455/456 |
| 2006/0078105 A1 * | 4/2006 | Korn et al. ............... | 379/210.02 |
| 2006/0121887 A1 * | 6/2006 | Chilukoor .................. | 455/412.2 |
| 2006/0182248 A1 * | 8/2006 | Smith et al. ............. | 379/201.01 |
| 2007/0037605 A1 * | 2/2007 | Logan .......................... | 455/567 |
| 2007/0079379 A1 * | 4/2007 | Sprosts et al. .................. | 726/24 |
| 2008/0039152 A1 * | 2/2008 | Arisawa ....................... | 455/567 |
| 2008/0301250 A1 * | 12/2008 | Hardy et al. .................. | 709/207 |
| 2009/0002127 A1 * | 1/2009 | Kraft et al. ................... | 340/7.52 |
| 2010/0262666 A1 * | 10/2010 | Kalu ............................. | 709/206 |
| 2010/0317341 A1 * | 12/2010 | Ferren ....................... | 455/426.1 |
| 2012/0149342 A1 * | 6/2012 | Cohen et al. .............. | 455/412.2 |
| 2013/0267280 A1 * | 10/2013 | Delco et al. .................. | 455/567 |

* cited by examiner

*Primary Examiner* — Fan Tsang
*Assistant Examiner* — Kharye Pope
(74) *Attorney, Agent, or Firm* — Blank Rome LLP

(57) ABSTRACT

A suppression override engine on a user device may be configured to detect communication alert suppressions. An incoming communication from a third party may be detected. Upon detecting the communication, the suppression override engine can override the communication alert suppression if it determines that the incoming communication is responsive to a prior communication from the user device. By overriding the alert suppression the user is then alerted to the incoming communication.

14 Claims, 10 Drawing Sheets

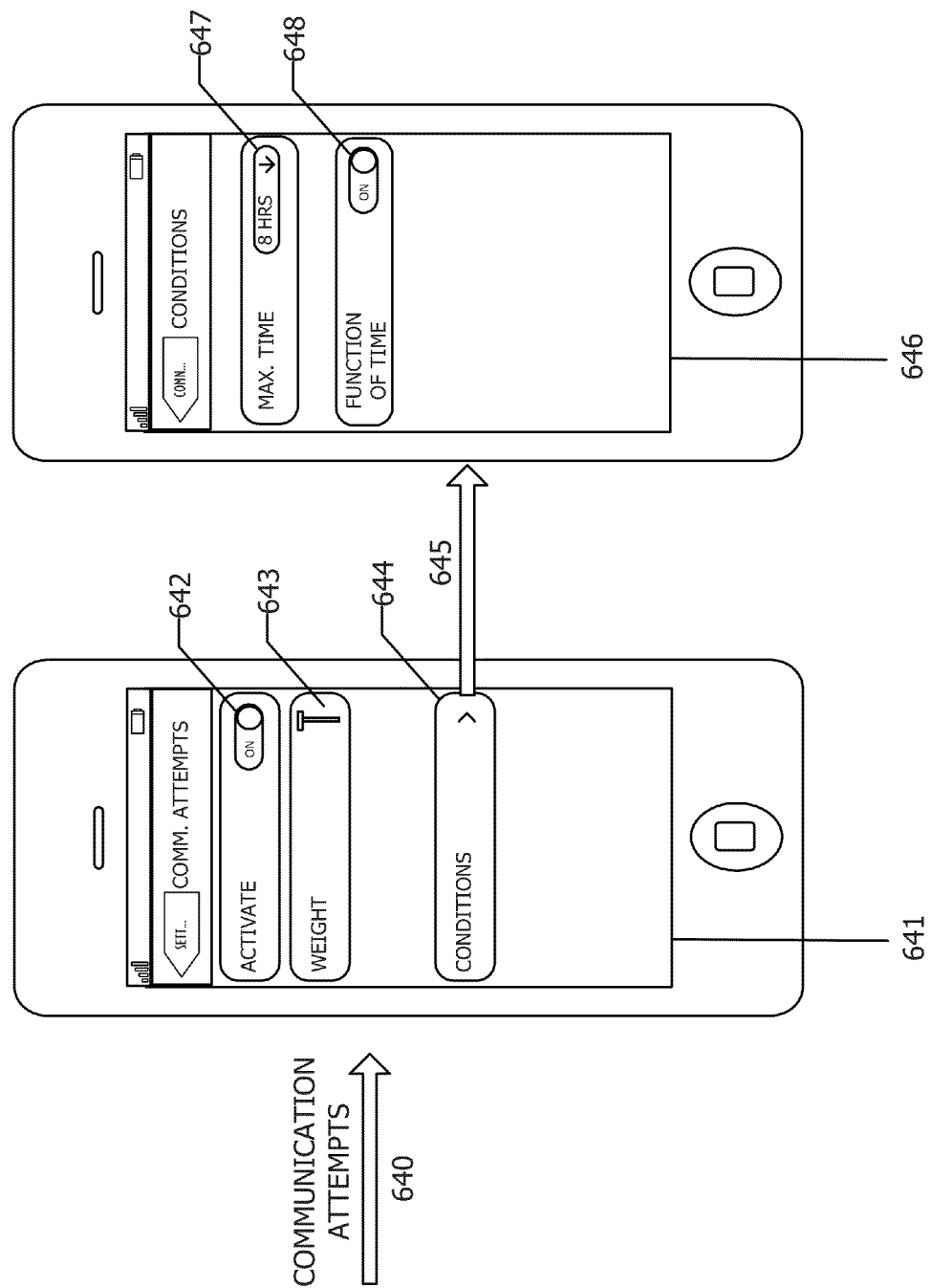

DYNAMICALLY OVERRIDING ALERT SUPPRESSIONS BASED ON PRIOR ACTIONS

BACKGROUND

Millions of people rely on electronic devices to communicate with their family, friends, co-workers, etc. These electronic devices include computers, mobile phones, tablet computers, or other similar electronic devices. And each device may include numerous communication channels, such as telephone, text messaging, mail, instant messaging, video chat, or various forms of social networking.

Although these electronic devices have simplified communications, they can also be a nuisance. For example, often alerts for incoming communications can interrupt important meetings, quiet events, or sleep with audible, visible, or light notifications. A few solutions exist to counter this problem. For example, users can suppress alerts by silencing their device, turning their device to a vibrate mode, or activating a "Do Not Disturb" (DND) feature during a preset period of time. Of these three suppression features, DND is the most customizable. For example, the user can customize a DND so that alerts are unsuppressed for certain contacts (e.g., family, co-workers, etc.). Alternatively, the user can customize a DND feature to suppress audible alerts, but allow certain visual alerts.

So, a user can activate their device to suppress communication alerts entirely, or to suppress communication alerts for a specified set of contacts. And any suppression is deactivated when a preset suppression period ends or the user manually ends the suppression (e.g., turning off the DND feature, reactivating a ring tone, etc.). But these devices cannot dynamically override alert suppressions based on prior user actions. For example, a user may want the system to override the alert suppression for a third party incoming communication when that communication is determined to be responsive. This would be particularly useful if the user is attempting to contact the third party when one or more alert suppressions are activated. Therefore, there is need in the art for systems and methods that can dynamically override an alert suppression based on a user's prior actions.

SUMMARY

A summary of certain embodiments disclosed herein is set forth below. It's understood that this section is presented merely to provide the reader with a brief summary of certain embodiments and that these descriptions are not intended to limit this application's scope. Indeed, this disclosure may encompass a variety of embodiments that may not be set forth herein.

In one embodiment, a method can detect an incoming communication having an associated alert. If the device is preset to suppress that alert, the method can evaluate whether the suppression should be overridden. In one embodiment, the method can override the suppression if the incoming communication is responsive to a prior communication from the device.

In another embodiment, a method dynamically calculates a probability that the incoming communication is responsive to a prior communication from the device. If the calculated probability is greater than a preset default or user-defined threshold, the method can override the alert suppression. By way of example only, a probability calculation can be based on communication data, including but not limited to one or more of the similarity between the content of the incoming communication and any prior outgoing communications, the time lapse between the incoming communication and a prior outgoing communication, and the number of outgoing communication attempts.

BRIEF DESCRIPTION OF THE DRAWINGS

The foregoing summary, as well as the following detailed description, will be better understood when read in conjunction with the appended drawings. For the purpose of illustration only, there is shown in the drawings certain embodiments. It's understood, however, that the subject matter disclosed herein is not limited to the precise arrangements and instrumentalities shown in the figures.

FIGS. 6A-6C show a number of screens that may be displayed to access communication data options, in accordance with an embodiment.

DETAILED DESCRIPTION

Figure 1A:
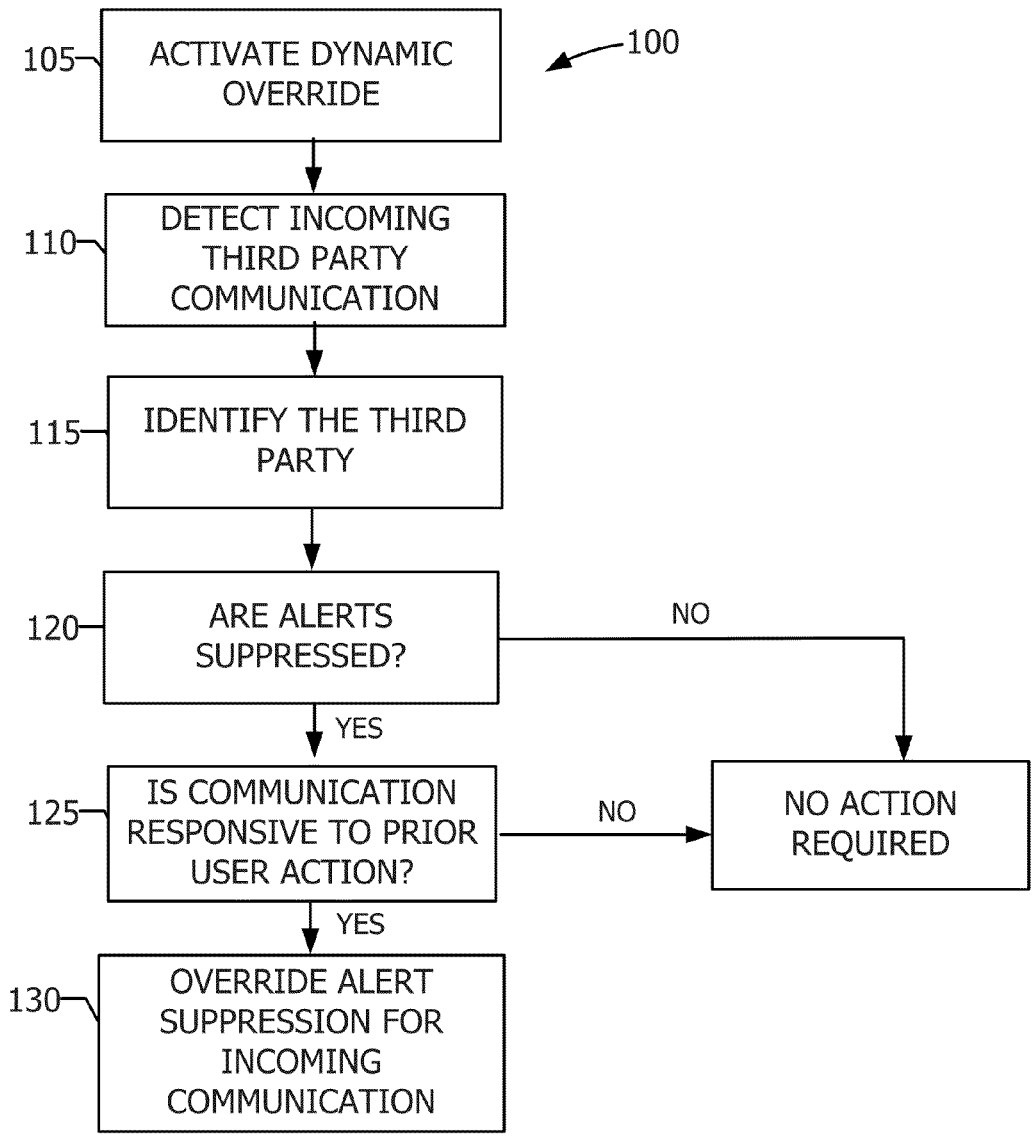
FIGS. 1A-1B are flow charts showing a method for dynamically overriding a communication alert suppression, in accordance with an embodiment.

This disclosure is generally directed to systems, methods, and computer readable media for dynamically and selectively overriding communication alert suppressions on an electronic device. In general, the application discloses techniques to detect an incoming third party communication and to determine whether that communication's associated alert is suppressed (e.g., the device is silenced, the device is set to vibrate, the third party is blocked, the device is set to Do No Disturb, etc.). The disclosed system can dynamically evaluate whether that incoming communication is responsive to at least one of the user's prior actions. A person of ordinary skill in the art understands that there are a number of ways to carry out this evaluation. For example, in one embodiment, the system may calculate a probability that the incoming communication is responsive. If the probability is greater than a preset default or user-defined threshold, then the communication is considered responsive, and the system overrides the suppression so that the user is alerted to the incoming communication.

Before explaining at least one embodiment in detail, it's understood that the inventive concepts set forth herein are not limited in their application to the construction details or component arrangements set forth in the following description or illustrated in the drawings, but are capable of other embodiments and being practiced and carried out in various ways. Also, it's understood that the phraseology and terminology employed herein are merely for descriptive purposes and are not considered limiting.

It's also understood that any one of the disclosed features may be used separately or in combination with other features. Other systems, methods, features, and advantages will be or become apparent to one with skill in the art upon examining the drawings and the detailed description herein. It's intended that all such additional systems, methods, features, and advantages be included within this description, be within the present invention's scope, and be protected by the accompanying claims.

Referring to FIG. 1A, an electronic device may carry out a method 100 for overriding a communication alert suppression. In one embodiment, a suppression override engine carries out the method 100, and the engine may function as a stand-alone application or may be integrated with the device's operating system. Furthermore, the device can be any type, including but not limited to workstation and desktop computer systems, mobile phones, personal music players, tablet computer systems, or other similar electronic devices.

A device's user can choose to suppress incoming communications in a number of ways. A person of ordinary skill in the art understands that such suppression can be any type, including but not limited to silencing the device, setting the device to vibrate, activating a Do Not Disturb (DND) feature, blocking one or more contacts, etc.

In an embodiment, the user may simultaneously suppress communication alerts and activate the device's dynamic override feature. This feature, according to preset default or user-defined settings, may dynamically override the aforementioned suppression based on the user's prior actions. As will be discussed in greater detail below, the user may activate this feature via a direct input into the device, including but not limited to voice command, text input, menu selection, etc. For example, the user may input the instructions through a stand-alone application or through the device's "User Preference's" interface or operating system.

When dynamic override is activated 105, the device can detect incoming communications from third parties 110 to the device. In one embodiment, the device can detect incoming communications from a variety of communication channels, including but not limited to telephone, text messaging, email, instant messaging, or any social networking. After the device detects the incoming communication 110 the method determines the third party's identity 115 and whether the device is set to suppress alerts from that particular third party 120. In one embodiment, the device may be set to suppress alerts for all incoming communications, regardless of third party identity. But in other embodiments, the device may be set to suppress alerts for only a specific group of third parties.

If the device is not suppressing the alert then no further action is required and an alert will notify the user to the incoming communication. However, if alerts are suppressed the device can determine whether the incoming communication is responsive 125. This determination may be based on preset default or user-defined criteria. In one embodiment, a direct reply may be considered responsive (e.g., email reply). In another embodiment, any third party incoming communication that follows a prior outgoing communication to that same party may be considered responsive. In yet another embodiment, any third party incoming communication that is made within a certain period of time following a prior outgoing communication to that same party may be considered responsive. A person of ordinary skill in the art understands that there are a number of scenarios for which an incoming communication may be considered responsive, and all of which are within the scope and spirit of this disclosure.

If the incoming communication is determined responsive then the system temporarily overrides the alert suppression and the user is alerted to the incoming communication 130. The scope of the temporary override may be preset default or user-defined. In one embodiment, the suppression override may apply only to the incoming communication. In another embodiment, the override may apply to the incoming communication and any further communications in a particular thread (e.g., replies in an email chain). In yet another embodiment, the override may apply to the third party for any communications transmitted by the third party within a certain period of time. In still another embodiment, the suppression override may apply to the third party for any communications transmitted by the third party within a certain period of time and through any communication channel.

Figure 1B:
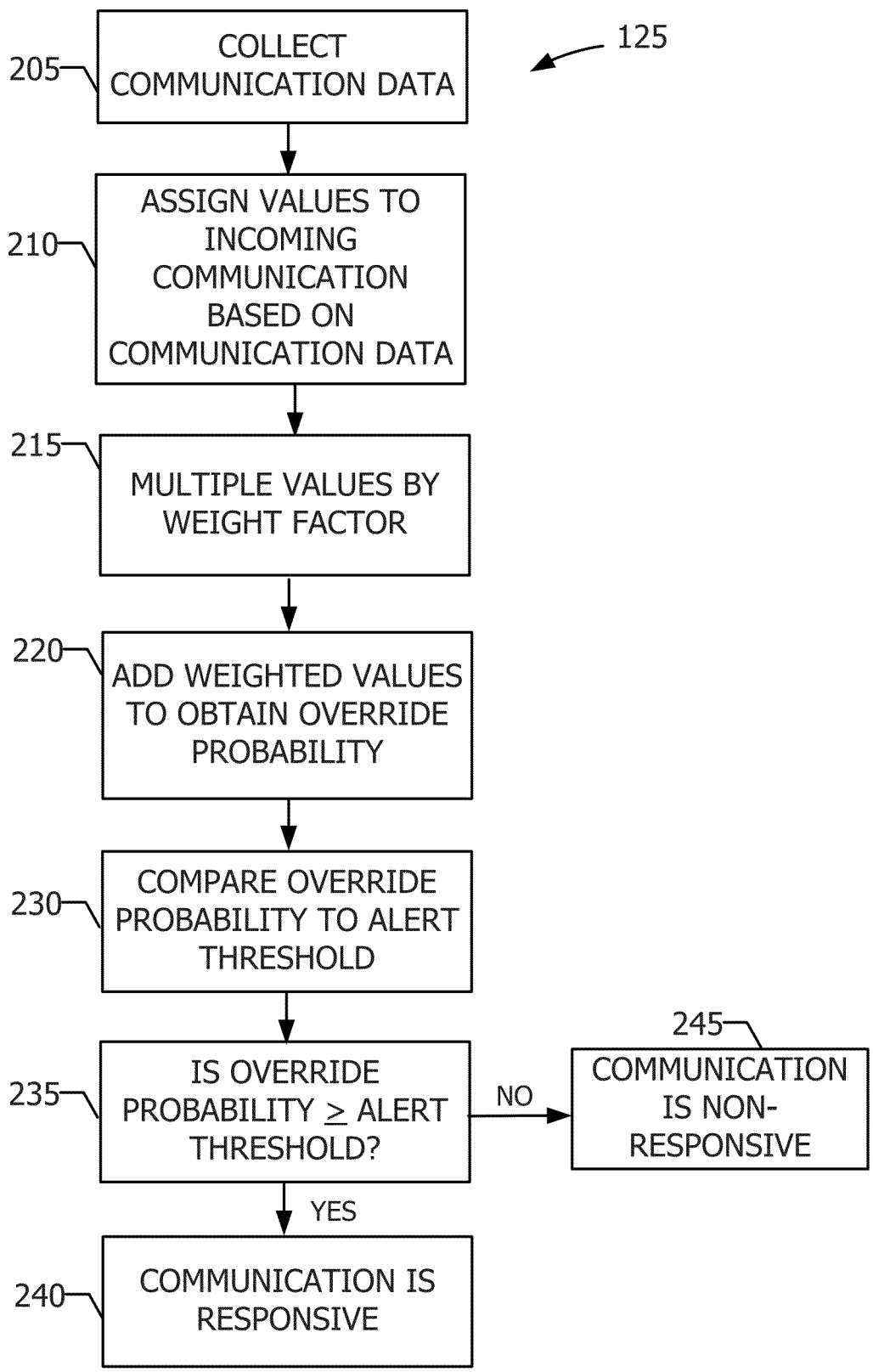

In one embodiment, the system can determine whether an incoming communication is responsive using a dynamic probability analysis. By way of example only, FIG. 1B illustrates one method to dynamically determine whether an incoming communication is responsive 125. If alerts are suppressed then the system can collect communication data 205. A person of ordinary skill in the art understands that communication data may include, without limitation, any data type that is relevant to and would facilitate determining the probability that the incoming communication is responsive to the user's prior actions, such as but not limited to prior outgoing communications from the device to the third party. Furthermore, communication data may be collected from a number of communication channels, including but not limited to telephone, text messaging, email, instant messaging, social networking, etc.

In one embodiment, communication data may include content similarities between the incoming communication and any prior outgoing communications. If an incoming communication has content similar to a prior outgoing communication then the incoming communication may be considered responsive because similar content is typically found in responsive communications (e.g., reply email includes substantially identical subject line to outgoing email). Based on preset defaults or user-defined configurations, content data may be collected from one or more of the incoming or outgoing communications' phone numbers, addresses, subject, body, attachments, metadata, etc. For example, content data may be collected from a phone number or address of a prior outgoing communication to the source and the incoming communication's phone number or address. A person of ordinary skill in the art understands that content similarities can be calculated by any number of known comparator methods, such as but not limited to word comparisons, phrase comparisons, etc. In yet another embodiment, the device may be configured to only collect content similarity data from communications transmitted by the user within a preset default or user-defined time period. By way of example only, in one embodiment, the device may be limited to collecting data within 24 hours prior to the incoming communication. Therefore, the device will not compare incoming communications to any outgoing communications transmitted outside the 24 hour period.

In another embodiment, communication data may include a time lapse between a third party incoming communication and a prior outgoing communication to that third party. Time lapse can indicate whether a communication is responsive. For example, an incoming communication that shortly follows an outgoing communication may indicate that the party is responding to the user's recent communication attempt. In one embodiment, data may include a time difference between the user's latest communication to the third party and the incoming communication. In another embodiment, time lapse may be calculated from the time the user sends the outgoing communication to the time the device detects the third party's incoming communication. In yet another embodiment, the device may only collect time lapse data within a preset default or user-defined time period. By way of example only, the device can be limited to collecting time lapse data within 12 hours prior to the incoming communication. Therefore, the device will not collect time lapse data if the latest outgoing communication to the third party is outside the 12 hour window.

In still another embodiment, communication data may include the number of outgoing communication attempts from the user to the third party. A number of outgoing communication attempts can indicate whether a communication is responsive. For example, an incoming communication that follows numerous outgoing communications to that same party may indicate the party is responding to the user's desperate communication attempts. In one embodiment, the data may include the number of consecutive times a user has unsuccessfully attempted to contact the third party. In another embodiment, the device can be limited to collecting communication event data within a preset default or user-defined time period. By way of example only, the device can be limited to collecting communication event data within 10 hours prior to the incoming communication. Therefore, the device will not collect communication event data if the latest outgoing communication to the third party is outside the 10 hour window.

After the system collects the communication data, one or more values may be assigned to the incoming communication based on the significance of each data type 210, including but not limited to the data types described above (e.g., content similarity data, time lapse data, communication event data, etc.). These values can include either preset default values, or user-defined values. Values may be numerical and scaled (e.g., from 1 to 10) and represent the weight the data type carries in the probability analysis. For example, the higher the value the more likely the incoming communication is responsive to an outgoing communication. Alternatively, the lower the value the less likely the incoming communication is responsive to an incoming communication. By way of example only, value is represented as $V_n$, where n is a data type.

In one embodiment, the system may assign a value, $V_{similarity}$, to the incoming communication based on content similarity data, which is described above. Thus, incoming communications having content highly similar to one or more transmitted outgoing communications may be assigned a higher value. Alternatively, incoming communications having content marginally similar to one or more transmitted outgoing communications may be assigned a substantially lower value.

As an example, directly responsive communications, such as email replies, may be assigned a substantially high value (e.g., 10) because their subject or body is virtually identical to the prior related outgoing communication. In another example, an incoming text message that includes substantially similar wording to a previous email from the user may be assigned a moderately high value (e.g., 7) since the text message is more than likely responsive to the user's prior email. Alternatively, as another example, an email that does not include any similar content to a prior communication may be assigned a value=0. A person of ordinary skill in the art understands that there are numerous possibilities or combinations in which values may be assigned based on content similarity data.

In another embodiment, the system may assign a value, $V_{elapsed}$, to the incoming communication based on time lapse data, which is described above in detail. Thus, incoming communications that are closer in time to a prior outgoing communication may be assigned a higher value. Alternatively, incoming communications that are further in time from a prior outgoing communication may be assigned a lower value. As already explained above, the time lapse data may be collected within a preset default or user-defined maximum time period. Thus, as the time difference between communications approaches the end of the set time period the assigned value approaches 0. In one embodiment, the assigned value may decrease linearly to 0 as the time lapse between the incoming and outgoing communication increases. In still another embodiment, the assigned value may decrease exponentially to 0 as the time lapse between the incoming and outgoing communication increases.

By way of example only, supposing the maximum time period is set to 10 hours, an incoming communication detected 15 minutes after a prior outgoing communication (i.e., a 15 minutes time lapse) may be assigned a substantially high value (e.g., 10). Alternatively, an incoming communication detected 3 hours after a prior outgoing communication (i.e., a 3 hour time lapse) may be assigned a more moderate value (e.g., 6). In another example, an incoming communication detected 9.9 hours after a prior outgoing communication may be assigned a value substantially close to 0.

In yet another embodiment, the system may assign a value, $V_{attempts}$, to the incoming communication based on communication attempt data, which is described above in detail. Thus incoming communications that follow numerous prior consecutive outgoing communications may be assigned a higher value. Alternatively, incoming communications that follow only one prior outgoing communication may be assigned a substantially lower value. In one embodiment, the assigned value may decrease linearly to 0 as the number of communication attempts decreases. In still another embodiment, the assigned value may decrease exponentially to 0 as the number of communication attempts decreases. As already explained above, the communication attempt data may be collected within a preset default or user-defined maximum time period. In yet another embodiment, $V_{attempts}$ is a function of time.

By way of example only, supposing the maximum time period is set to 10 hours, an incoming communication that follows 2 outgoing communications to the party during the 10 hour period may receive a relatively low value (e.g., 2). Alternatively, an incoming communication that follows 10 outgoing communications to the identified third party during the prior 10 hour period may receive a substantially high value (e.g., 10). In yet another embodiment, the value assigned to the communication attempt data may also be a function of time. Thus, for example, an incoming communication that follows 5 outgoing communications transmitted within 1 minute may receive a substantially higher priority than an incoming communication that follows 5 outgoing communications transmitted over a span of 2 hours.

After the system assigns values to the incoming communication 210 (e.g., $V_{similarity}$, $V_{elapsed}$, $V_{attempts}$) those values may be multiplied by a weight factor 215. The weight factor may be a preset default or user-defined multiplier that represents the importance of one data type over another. As with values, the weight factors may also be numerically scaled (e.g., 1 to 10). Thus, the higher the weight factor, the more important the communication data type.

As an example, a user may consider content similarity data substantially more important than time lapse data. Thus, the user may multiply the content similarity data value by a substantially higher weight factor a (e.g., $V_{similarity}*10$) and multiply the time lapse data value by a substantially lower weight factor b (e.g., $V_{elapsed}*2$). In yet another example, the user may consider communication attempt data more important than time lapse data, but less important than content similarity data. Thus, the user may multiply the communication attempt data value by a more moderate weight factor c (e.g., $V_{attempts}*5$).

Once the assigned values are weighted 215 they may be summed to obtain a total override probability, OP 220. For example, the following equation represents one embodiment of determining an override probability:

$$V_{similarity}a + V_{elapsed}b + V_{attempts}c = OP,$$

The OP represents the probability that the incoming communication is responsive to a prior outgoing communication based on a number of communication data and preset default or user-defined weight factors. A person of ordinary skill in the art understands that any number of known probability functions can be used to calculate the override probability, such as but not limited to probability distribution functions, cumulative distribution functions, etc. Furthermore, in addition to the communication data, the device may also calculate the override probability based on any number of preset default parameters, preset user-defined parameters, or both.

The system may next compare the calculated override probability OP to an alert threshold 230. This threshold can represent the minimum probability at which an incoming communication is considered responsive to a prior outgoing communication. The alert threshold may either be based on a preset default or user-defined threshold. For example, in one embodiment, the user can adjust the threshold to a substantially high value so that only high override probabilities may indicate that an incoming communication is responsive. Alternatively, in another embodiment, the user can adjust the threshold to a moderate value so that merely moderate override probabilities may indicate that the incoming communication is responsive.

In one embodiment, if the override probability OP is less than the alert threshold 235, the incoming communication may be deemed non-responsive 245 and the communication's alert may remain suppressed. However, if the override probability is greater than or equal to the alert threshold, the incoming communication may be deemed responsive 245 and the alert suppression may be overridden so that the user is alerted to the incoming communication.

Figure 2:
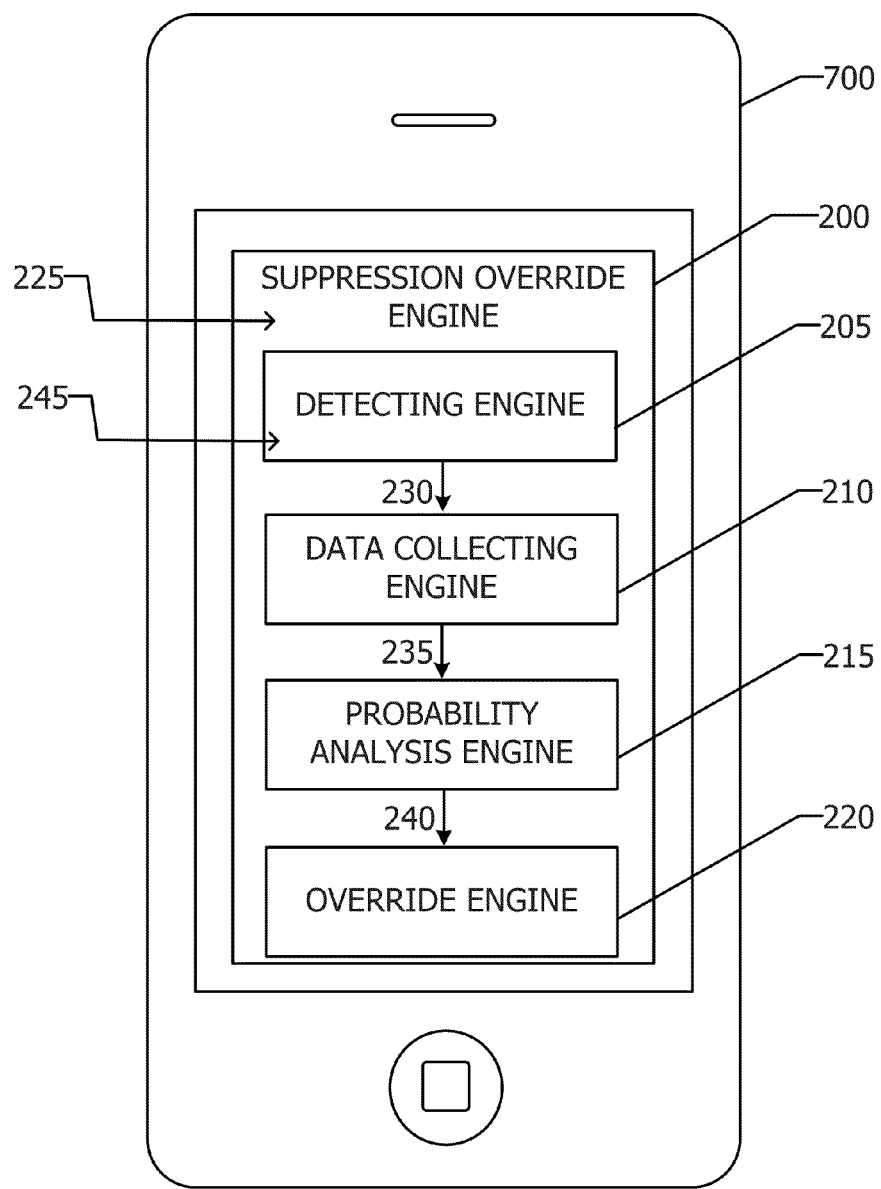
FIG. 2 shows components of a suppression override engine, in accordance with an embodiment.

FIG. 2 illustrates one embodiment of the aforementioned suppression override engine 200. The suppression override engine 200 may be designed to carry out the methods described in FIGS. 1A-1B, and any other methods derived therefrom or within the spirit and scope of this application.

Suppression override engine 200 may be a stand-alone application or may integrate with a device's 700 operating system and hardware. The device 700 can be any type, including but not limited to workstation and desktop computer systems, mobile phones, personal music players, tablet computer systems, or other similar electronic devices.

A user may activate the suppression override engine 200 through the device's dynamic override settings. Furthermore, the engine 200 may receive one or more suppression override settings, which may include either preset default settings, user-configured settings, or both (225). As explained above for FIGS. 1A-1B, such settings may include but are not limited to (1) settings specific to certain communication data types; (2) weight factors; (3) an alert override threshold; or (4) conditions pertaining to a temporary suppression override.

The detecting engine 205 can detect incoming communication events (245). For example, it can detect incoming communications from a third party. In one embodiment, the detecting engine 205 may also determine the identity of the third party. In another embodiment, the detecting engine 205 can detect incoming communications from any communication channel, including but not limited to telephone, text messaging, instant messaging email, social networking, etc.

The detecting engine 205 can also determine whether the device is configured to suppress alerts for the third party. If not, then no further action is required and the user will be alerted to the communication. However, if alerts are suppressed for the third party, the detecting engine 205 can pass to a data collecting engine 210 incoming communication information, such as the incoming communication's content, the third party's identity, the time the communication was detected, etc. (230).

Once the data collecting engine 210 receives the incoming communication information it collects communication data from the incoming communication and the device. As explained in detail above for FIGS. 1A-1B, communication data may be collected from any device communication channel, including but not limited to telephone, text messaging, email, instant messaging, social networking, etc. In another embodiment, the device may collect communication data from the device's data logs, such as communication logs. A person of ordinary skill in the art understands that communication data may include, without limitation, any data that would facilitate determining a probability that the incoming communication is responsive to a prior outgoing communication. For example, as already described above in detail, communication data may include one or more of content similarity data, time lapse data, and communication attempt data.

After all communication data is collected, as determined by preset defaults or user-configured settings, the data collecting engine 210 transmits the communication data to a probability analysis engine 215 (235). This engine 215 may calculate the override probability, which is the probability that the incoming communication is responsive to a prior outgoing communication. A person of ordinary skill in the art understands that any number of known probability functions can be used to calculate the override probability, such as but not limited to probability distribution functions, cumulative distribution functions, etc. Furthermore, in addition to the communication data, the engine 215 may also calculate the override probability based on preset default parameters, preset user-defined parameters, or both (e.g., weight factors).

In one embodiment, the probability analysis engine 215 may carry out the method illustrated in FIG. 1B and described in detail above. Thus, the probability analysis engine 215 may assign values $V_n$ to each collected communication data type and multiply those values to preset default or user-defined weight factors. Furthermore, the probability analysis engine 215 may sum together the weighted communication data values to calculate an override probability OP.

Finally, the probability analysis engine 215 can pass the override probability OP to an override engine 220 (240). The override engine 220 may then compare the override probability OP to a preset default or user-defined alert threshold. In one embodiment, if OP<alert threshold (i.e. the incoming communication is likely not responsive) then no further action may be required and the communication's alert remains suppressed. However, if OP≥alert threshold (i.e., the incoming communication is probably responsive), the override engine 220 can deactivate the alert suppression and the user may receive an alert for the incoming communication. As explained above, the scope of the override may be preset default or user-defined.

Figure 3:
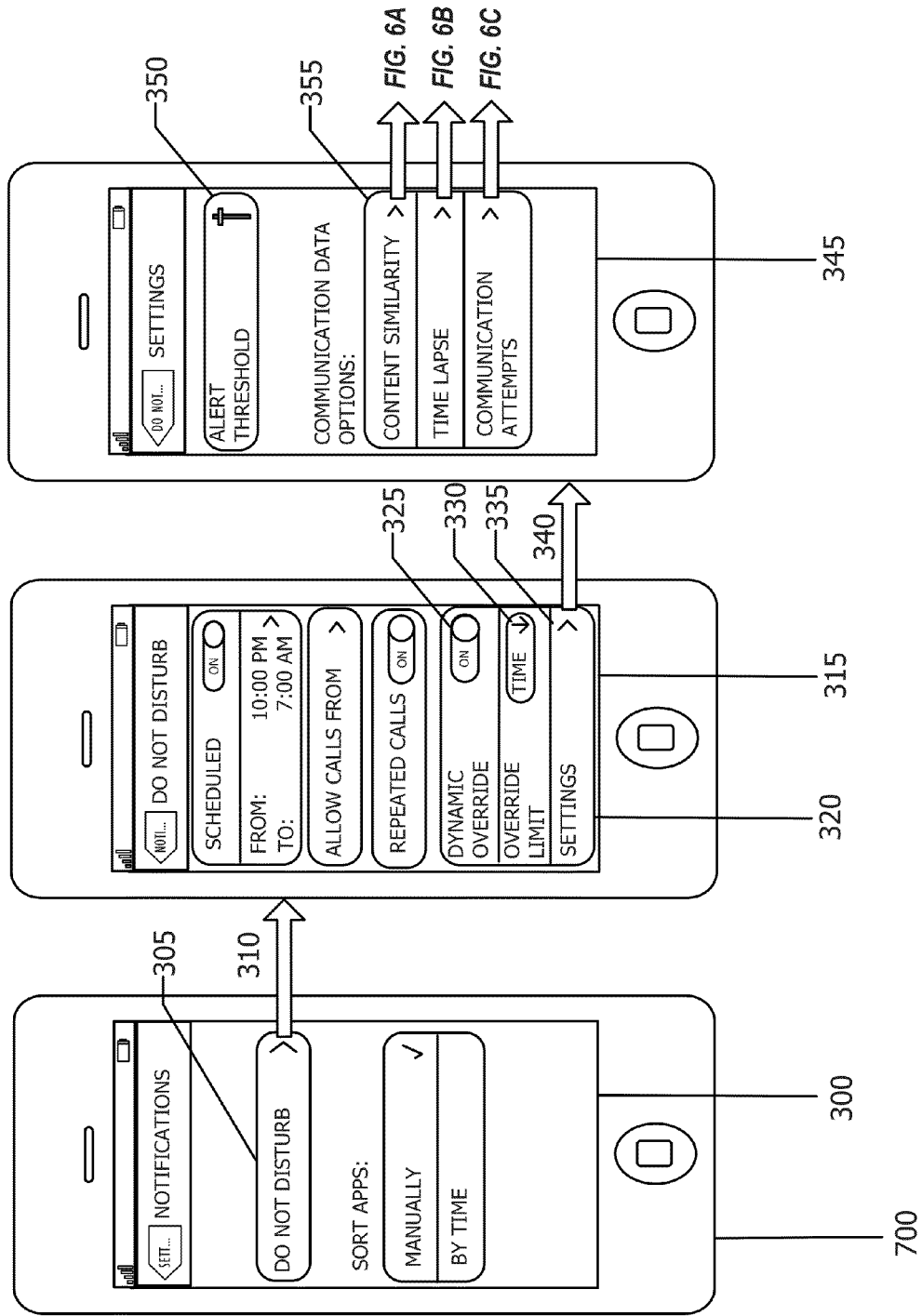
FIG. 3 shows a number of screens that may be accessed, via a DND interface, to override an alert suppression, in accordance with an embodiment.
Figure 4:
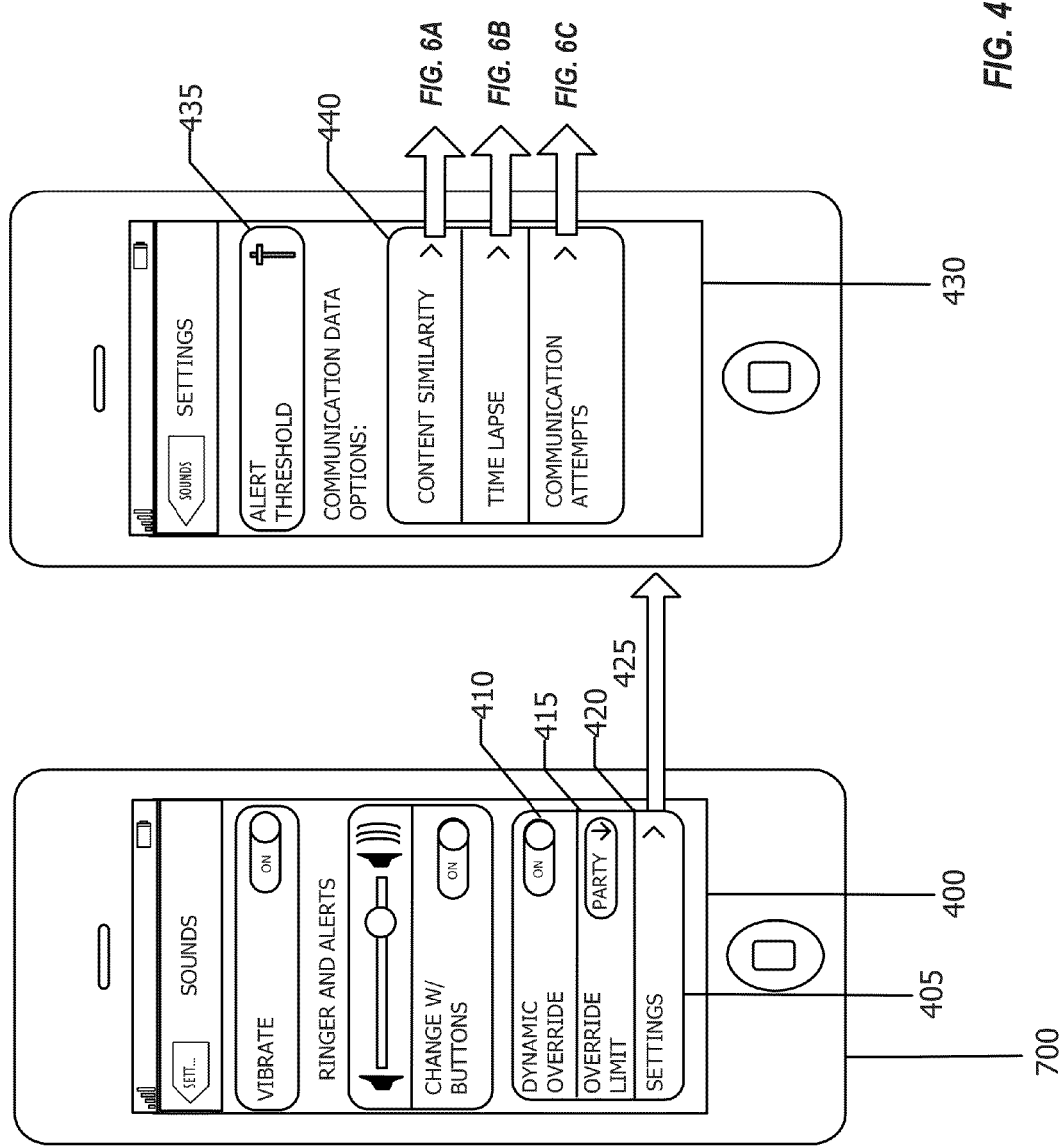
FIG. 4 shows a number of screens that may be accessed, via a Sound interface, to override an alert suppression, in accordance with an embodiment.
Figure 5:
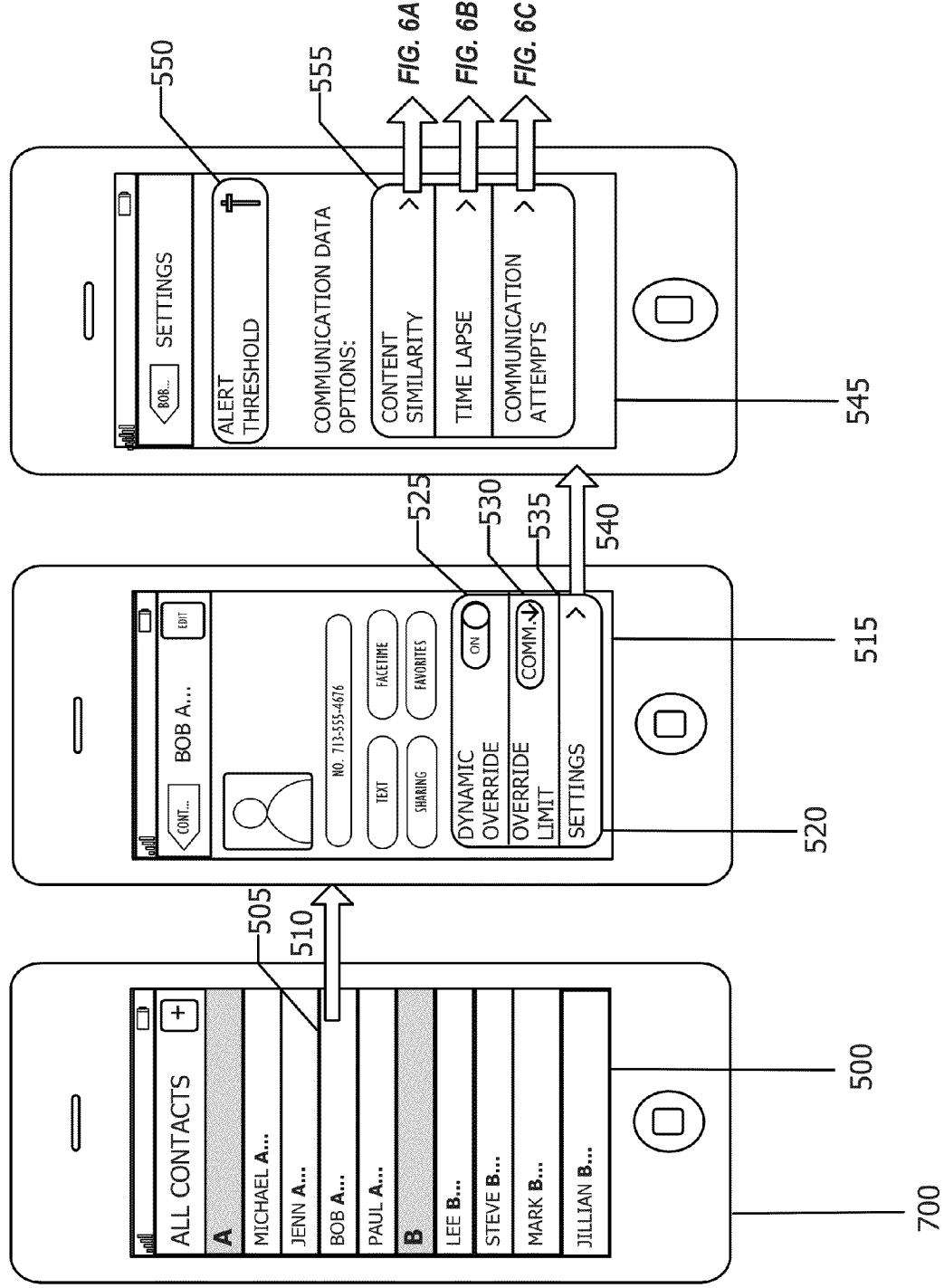
FIG. 5 shows a number of screens that may be accessed, via a contacts list, to override an alert suppression, in accordance with an embodiment.

FIGS. 3-5, by way of non-limiting examples, illustrate a number of screens that can be accessed by a user to activate and configure dynamic override in accordance with the embodiments described herein. The screen features can be activated via buttons, which may include touch buttons, sliders, switches, control pads, keys, knobs, scroll wheels, keyboards, mice, touchpads, etc., or some combination thereof. In one embodiment, the buttons may allow a user to navigate a graphical user interface (GUI) display. Further, in certain embodiments, the buttons may include a touch screen mechanism. In such embodiments, a user may select or interact with displayed interface elements by simply touching those elements.

A user can activate a dynamic override feature in response to suppressing communication alerts on a device. For example, the user can activate the dynamic override in response to suppressing communication alerts via a DND feature, silencing the device, setting the device to vibrate, or blocking a contact. It's also understood that the device can be any type, including but not limited to workstation and desktop computer systems, mobile phones, personal music players, tablet computer systems, or other similar electronic devices. Furthermore, it's understood that the dynamic override feature can function as a stand-alone application, may be integrated in applications that suppress alerts, or may be integrated with the device's operating system.

In one embodiment, a user may choose to activate dynamic override in response to suppressing communication alerts via the device's DND feature, which suppresses the alerts during a preset default or user-defined time period (e.g., during a business meeting, or during sleep hours). It's understood that the DND feature can function as a stand-alone application or may be integrated with the device's operating system. Referring to FIG. 3, by way of example only, the user may select the DND feature 305 through the device's notifications interface 300. Selecting this feature 305 opens the DND interface 315 (310). This interface 315 can include various features for scheduling a DND suppression during a certain period of time. In addition, in one embodiment, the DND feature may allow a user to exempt certain contacts from the DND's alert suppression.

In an embodiment, the DND interface 315 may include a dynamic override interface 320. A person of ordinary skill in the art understands that this interface 320 may include any number of options that can facilitate overriding the DND's alert suppression. For example, in one embodiment, the user can activate the dynamic override via an on/off button 325. In addition, the user may further select the override limits via a drop down menu 330. For example, as explained above, the user can limit the override to one or more of a particular type of incoming communication, the particular party, or a certain time period.

In addition, in yet another embodiment, the dynamic override interface 320 may include a settings button 335. Selecting this button 335 opens a settings Interface 345 (340). A person of ordinary skill in the art understands that the settings interface 345 can include any number of settings that can facilitate overriding the DND's alert suppression. By way of example only, the settings interface 345 may include an alert threshold slider 350 to manually adjust the alert threshold. In this example, the alert threshold represents the minimum probability at which an incoming communication is considered responsive enough to a prior outgoing communication to warrant overriding the DND's alert suppression.

In yet another embodiment, the settings interface 345 includes a number of options 355 pertaining to communication data, including but not limited to options for one or more of the above described content similarity data, time lapse data, and communication attempt data. These specific options are described below in FIGS. 6A-6C by way of example only. However, a person of ordinary skill in the art understands that the interface 345 may include additional options pertaining to other communication data types including, without limitation, any data type that is relevant to and would facilitate determining the probability that an incoming communication is responsive to a user's prior actions.

In another embodiment, a user may choose to activate dynamic override in response to suppressing communication alerts via the device's sound settings. Sound settings can be used to suppress communication alerts by silencing the device or setting the device to vibrate. It's understood that sound settings may function as a stand-alone application or may be integrated with the device's operating system. Referring to FIG. 4, by way of example only, a user can access a sound settings interface 400 on a device 700. This interface 400 may include various options for suppressing alerts, including options for silencing the device or setting the device to vibrate.

In one embodiment, the sounds interface 400 may include a dynamic override interface 405. A person of ordinary skill in the art understands that this interface 405 may include any number of options that can facilitate overriding a device's silence or vibrate setting. For example, in one embodiment, the user can activate the dynamic override via an on/off button 410. In addition, the user may further select the override limits via a drop down menu 415. For example, as explained above, the user can limit the override to one or more of the particular incoming communication, the particular party, or a certain time period.

In addition, in yet another embodiment, the dynamic override interface 405 may include a settings button 420. Selecting this button 420 opens a settings interface 430 (425). A person of ordinary skill in the art understands that the settings interface 430 can include any number of settings that can facilitate overriding the device's silence or vibrate setting. By way of example only, the settings interface 430 may include an alert threshold slider 435 to manually adjust the alert threshold. In this example, the alert threshold represents the minimum probability at which an incoming communication is considered responsive enough to a prior outgoing communication to warrant overriding the device's silence or vibrate suppression.

In yet another embodiment, the settings interface 430 includes a number of options 440 pertaining to communication data, including but not limited to options for one or more of the above described content similarity data, time lapse data, and communication attempt data. These specific options are described below in FIGS. 6A-6C by way of example only. However, a person of ordinary skill in the art understands that the interface 430 may include additional options pertaining to other communication data types including, without limitation, any data type that is relevant to and would facilitate determining the probability that an incoming communication is responsive to a user's prior actions.

In still another embodiment, a user may choose to activate dynamic override in a contacts list in response to blocking communications from a particular party. It's understood that the contacts list can include any of the user's contacts lists, including but not limited to telephone contacts, text messaging contacts, email contacts, instant messaging contacts, social networking contacts, etc. It's also understood that the contacts list can function as a stand-alone application or may be integrated with the device's operating system. Referring to FIG. 5, by way of example only, a user can access a contacts list 500 on a device 700. In this example, Bob A 505 has been previously blocked from communicating with the user's device, i.e., the device is suppressing Bob A's incoming communication alerts. Selecting Bob A 505 opens a contact options interface 515 for Bob A (510). This interface 515 may include a number of options for interacting with Bob A, including text messaging, facetime, sharing, etc.

In one embodiment, the contact options interface 515 may further include a dynamic override interface 520. A person of ordinary skill in the art understands that this interface 520 may include any number of options that can facilitate overriding Bob A's communication block. For example, in one embodiment, the user can activate the dynamic override via an on/off button 525. In addition, the user may further select the override limits via a drop down menu 530. For example, as explained above, the user can limit the override to one or more of the particular incoming communication, the particular party, or a certain time period.

In addition, in yet another embodiment, the dynamic override interface 520 may include a settings button 535. Selecting this button 535 opens a settings interface 545 (540). A person of ordinary skill in the art understands that the settings interface 545 can include any number of settings that can facilitate overriding Bob A's communication block. By way of example only, the settings interface 545 may include an alert threshold slider 550 to manually adjust the alert threshold. In this example, the alert threshold represents the minimum probability at which an incoming communication is considered responsive enough to a prior outgoing communication to warrant overriding Bob A's communication block.

In yet another embodiment, the settings interface 545 includes a number of options 555 pertaining to communication data, including but not limited to options for one or more of the above described content similarity data, time lapse data, and communication attempt data. These specific options are described below in FIGS. 6A-6C by way of example only. However, a person of ordinary skill in the art understands that the interface 545 may include additional options pertaining to other communication data types including, without limitation, any data type that is relevant to and would facilitate determining the probability that an incoming communication is responsive to a user's prior actions.

Figure 6A:
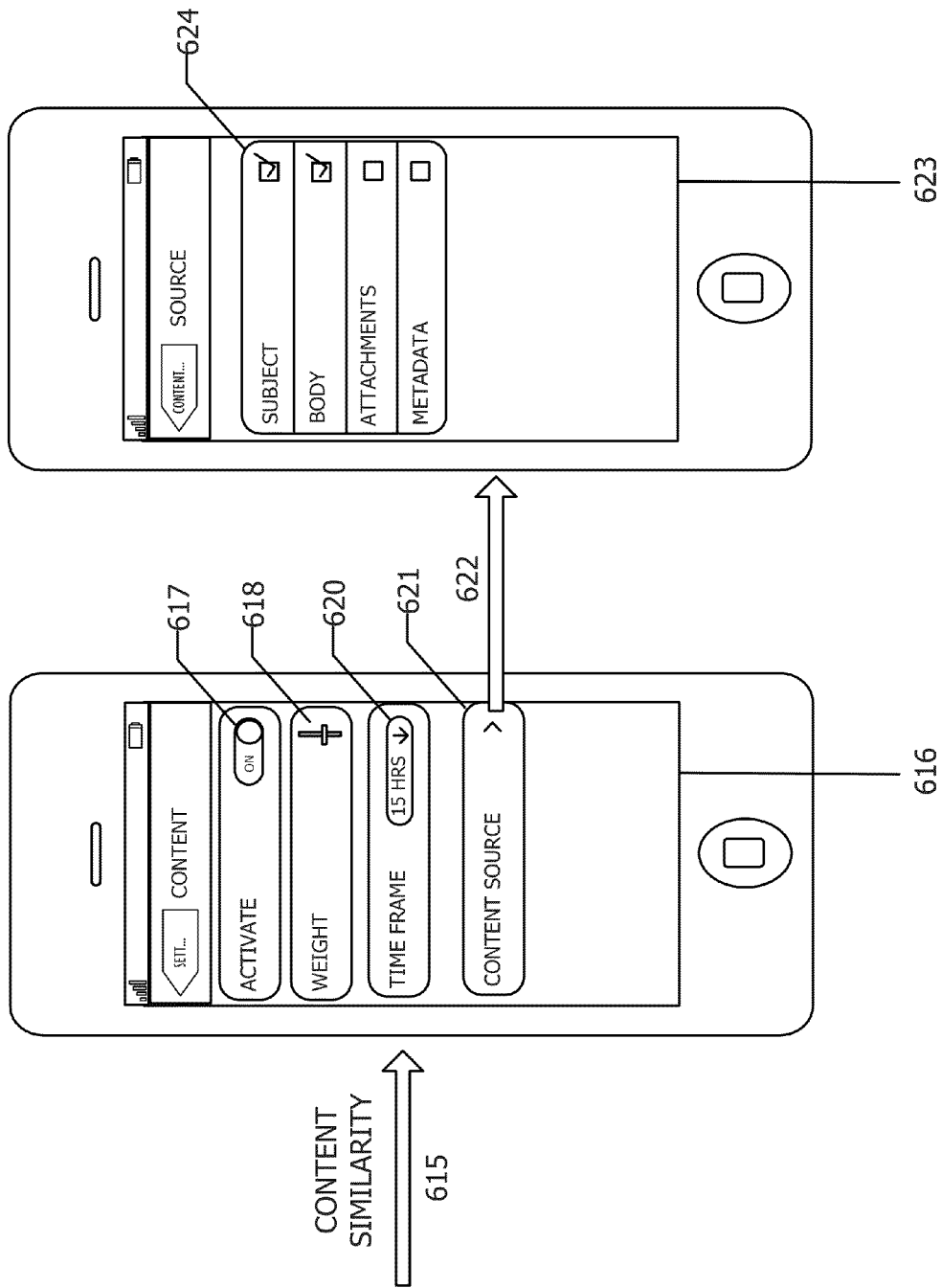
Figure 6B:
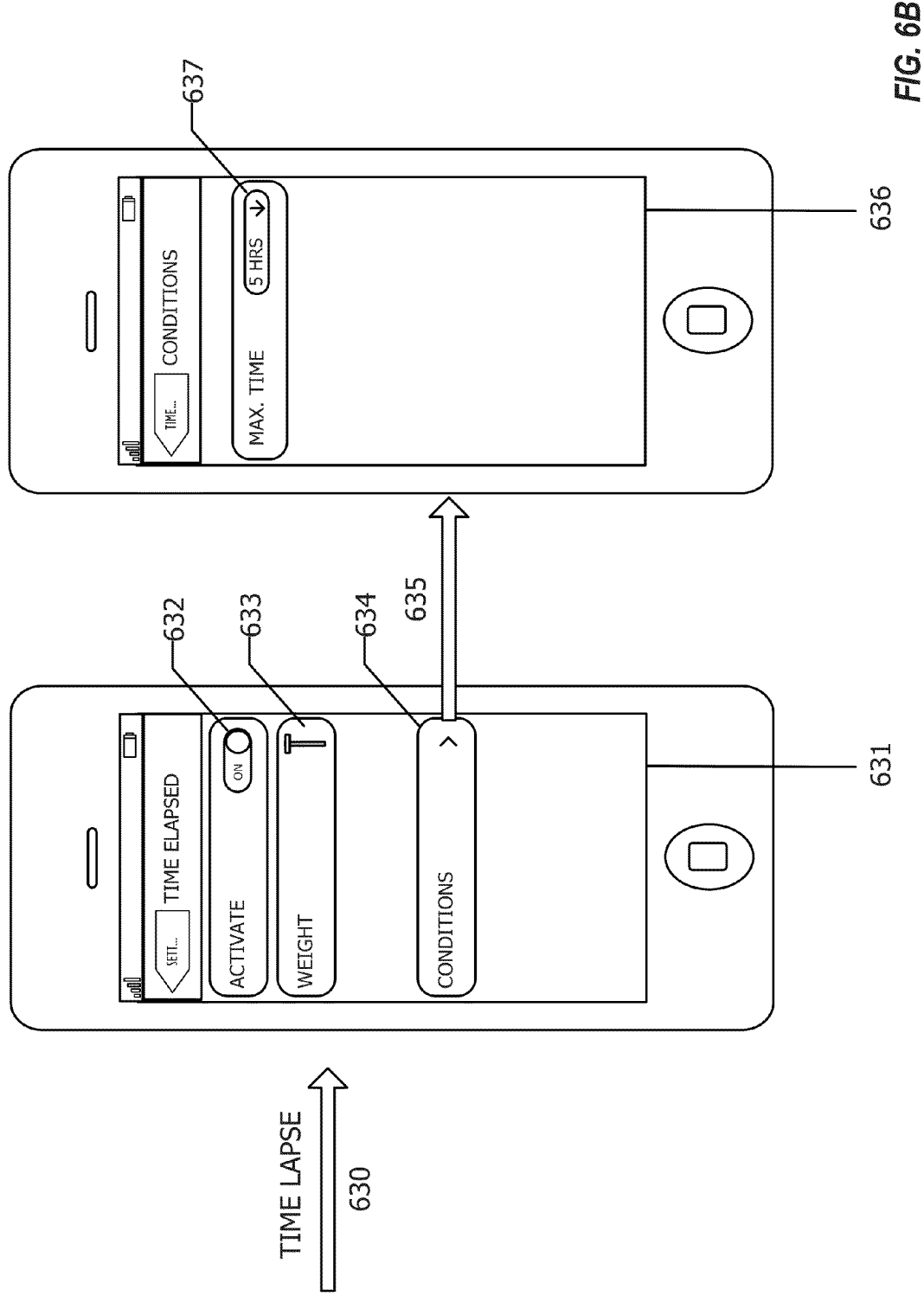

FIGS. 6A-6C, by way of example only, show a number of screens for configuring various communication data options for one or more of content similarity data, time lapse data, and communication attempt data, in accordance with the embodiments described herein. These options may be accessible through the dynamic override settings interfaces 345, 430, 545 described above for FIGS. 3-5. Furthermore, these options may include one or more preset default or user-defined parameters for use in the above described override probability OP analysis (e.g., communication data scope, weight factors, etc.).

Referring to FIG. 6A, by way of example only, selecting a content button (615) opens the content similarity interface 616. A user may configure the system to consider content similarity data in the override probability analysis by toggling an on/off button 617. In one embodiment, the user may assign a weight factor to the content similarity data, which represents the importance of this data in the probability analysis versus other communication data types. For example, the user can move a slider 618 upwards or downwards to a desired weight factor.

In one embodiment, the user can limit the time period within which the device may collect content similarity data. By way of example only, in one embodiment, the user may select, via a drop down menu 620, a time period (e.g., 15 hours). Therefore, the system will only consider content similarities within 15 hours prior to the incoming communication.

Furthermore, in still another embodiment, the user may limit the content sources from which the device may collect content similarity data. For example, the user can select a content source button 621 to open a content source interface 623 (622). Through a number of check boxes 624 the user can select or deselect content sources, including but not limited to "subject," "body," "attachments," "metadata," etc. Thus, for example, if the user only selects "subject" and "body," the system may only compare content similarities between the subjects and bodies of the incoming communication and any prior outgoing communications. A person of ordinary skill in the art understands that there are numerous possible combinations for selecting content sources, and that other known content sources are within the scope and spirit of this invention.

Referring to FIG. 6B, by way of example only, selecting a time lapse button (630) opens the time lapse interface 631. A user may configure the system to consider time lapse data in the override probability analysis by toggling an on/off button 632. In one embodiment, the user may assign a weight factor to the time lapse data, which represents the importance of this data in the probability analysis versus other communication data types. For example, the user can move a slider 633 upwards or downwards to a desired weight factor.

In one embodiment, the user can select a conditions button 634 to open a conditions interface 636 (635). Through this interface 636 the user can limit the time period within which the device may collect time lapse data. For example, the user can select, via a drop down menu 637, a time period (e.g., 5 hours). Therefore, the system will only consider time lapses within 5 hours prior to the incoming communication.

Referring to FIG. 6C, by way of example only, selecting a communication attempts button (640) opens the communication attempts interface 641. A user may configure the system to consider communication attempts data in the override probability analysis by toggling an on/off button 642. In one embodiment, the user may assign a weight factor to the communication attempts data, which represents the importance of this data in the probability analysis versus other communication data types. For example, the user can move a slider 643 upwards or downwards to a desired weight factor.

In one embodiment, the user can select a conditions button 644 to open a conditions interface 646 (645). Through this interface 646 the user can limit the time period within which the device may collect communication attempt data. For example, the user can select, via a drop down menu 647, a time period (e.g., 8 hours). Therefore, the system will only consider communication attempts made within 8 hours prior to the incoming communication. In an alternative embodiment, the user can set the system to evaluate communication attempts as a function of time by toggling an on/off button 648.

Figure 7:
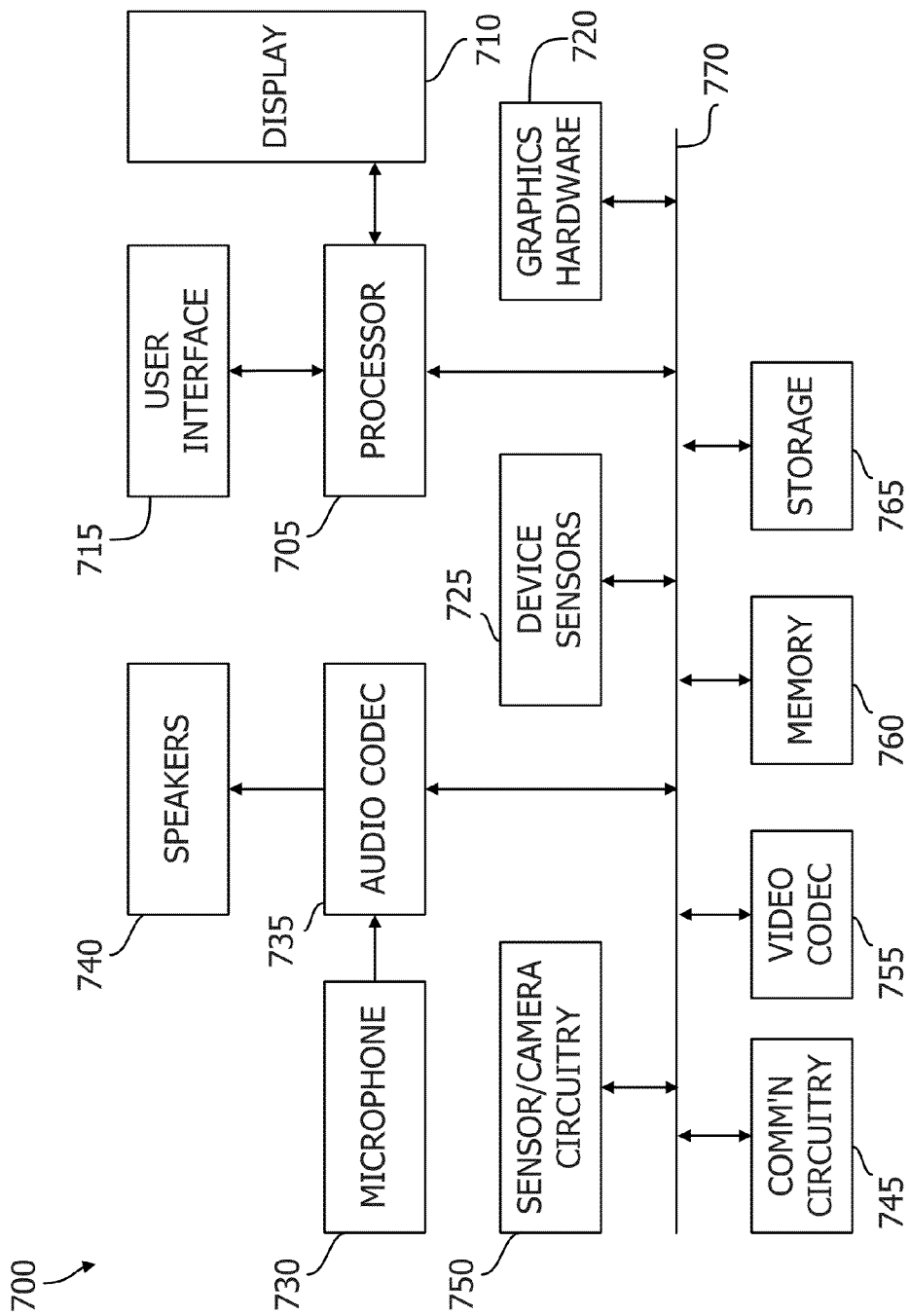
FIG. 7 shows a model electronic device, in accordance with an embodiment.

FIG. 7 illustrates a simplified functional block diagram of one embodiment of the electronic device 700. The electronic device 700 may include a processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, digital image capture unit 750, video codec(s) 755, memory 760, storage 765, and communications bus 770. The electronic device 700 may be, for example, a personal digital assistant (PDA), personal music player, mobile telephone, notebook, laptop, tablet computer, or any other similar device. Furthermore, the suppression override engine 200 may be executed on a device that takes the form of device 700.

The processor 705 may execute instructions necessary to carry out or control the operation of many functions performed by device 700. The processor 705 may, for instance, drive display 710 and receive user input from user interface 715. User interface 715 can take a variety of forms, such as a button, keypad, dial, a click wheel, keyboard, display screen and/or a touch screen. Processor 705 may also, for example, be a system-on-chip such as those found in mobile devices and include a dedicated graphics processing unit (GPU). Processor 705 may be based on reduced instruction set computer (RISC) or complex instruction-set computer (CISC) architectures or any other suitable architecture and may include one or more processing cores. Graphics hardware 720 may be special purpose computational hardware for processing graphics and/or assisting processor 705 to process graphics information. In one embodiment, graphics hardware 720 may include a programmable graphics processing unit (GPU).

Sensor and camera circuitry 750 may capture still and video images that may be processed, at least in part, by video codec(s) 755 and/or processor 705 and/or graphics hardware 720, and/or a dedicated image processing unit incorporated within circuitry 750. Images so captured may be stored in memory 760 and/or storage 765. Memory 760 may include one or more different types of media used by processor 705 and graphics hardware 720 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to tangibly retain computer program instructions or code organized into one or more modules and written in any desired computer programming language. When executed by processor 705 such computer program code may implement one or more of the methods described herein.

It's understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A non-transitory computer storage medium encoded with a computer program, the program comprising instructions that when executed by a data processing apparatus cause the data processing apparatus to:
   detect an incoming communication to a device;
   determine the device has been configured to suppress alerts for the incoming communication;
   determine the incoming communication is a response to a prior outgoing communication from the device by—
      determining a source of the incoming communication,
         selectively determining a value indicative of a probability that the incoming communication is responsive to a prior outgoing communication to the source, wherein determining the value is based on at least one of: a comparison of a phone number of at least one of the one or more prior outgoing communications to the source and the incoming communication, a comparison of an address of at least one of the one or more prior outgoing communications to the source and the incoming communication, a comparison of a subject line of at least one of the one or more prior outgoing communications to the source and the incoming communication, a comparison of metadata of at least one of the one or more prior outgoing communications to the source and the incoming communication, a number of prior outgoing communications to the source, content similarity between the incoming communication and one or more prior outgoing communications to the source, and a time lapse between the incoming communication and the prior outgoing communication to the source, and
         determining the value is greater than a specified threshold; and
      override the configured alert suppression based, at least in part, on having determined the incoming communication is a response to a prior outgoing communication from the device; and
   generate an alert for the incoming communication.

2. The non-transitory program storage device of claim 1, wherein the instructions to cause the data processing apparatus to detect an incoming communication comprise instructions to cause the data processing apparatus to detect an incoming email message.

3. The non-transitory program storage device of claim 1, wherein the instructions to cause the data processing apparatus to detect an incoming communication comprise instructions to cause the data processing apparatus to detect one of at least the following: email message, voice call, instant message, facetime contact, and a message from a social network.

4. The non-transitory program storage device of claim 1, wherein the instructions to cause the data processing apparatus to determine the device has been configured to suppress alerts for the incoming communication comprise instructions to cause the data processing apparatus to detect the device has been configured to suppress incoming communications from a plurality of sources.

5. The non-transitory program storage device of claim 1, wherein the instructions to cause the data processing apparatus to determine the device has been configured to suppress alerts for the incoming communication comprise instructions to cause the data processing apparatus to detect the device has been configured to operate in one or more of a silent mode, vibrate, and set to a Do Not Disturb state.

6. The non-transitory program storage device of claim 1, wherein the instructions to cause the data processing apparatus to determine a value indicative of a probability that the incoming communication is responsive to a prior outgoing communication to the source comprise instructions to cause the data processing apparatus to determine the value indicative of the probability based, at least in part, on a plurality of communication data.

7. The non-transitory program storage device of claim 6, wherein the instructions to cause the data processing apparatus to determine the value indicative of the probability based, at least in part, on a plurality of communication data comprise instructions to cause the data processing apparatus to determine the value indicative of the probability based, at least in part, on a weighted sum of the plurality of communication data.

8. The non-transitory program storage device of claim 7, wherein weights for at least one of the plurality of communication data are set in accordance with a user-defined preference.

9. The non-transitory program storage device of claim 1, wherein the instructions to cause the data processing apparatus to determine a number of prior outgoing communications to the source comprise instructions to cause the data processing apparatus to determine the value based, at least in part, on a number of prior outgoing communications to the source within a specified time period.

10. The non-transitory program storage device of claim 1, wherein the instructions to cause the data processing apparatus to determine a number of prior outgoing communications to the source comprise instructions to cause the data processing apparatus to determine the value based, at least in part, on a number of consecutive times the device has unsuccessfully attempted to contact the source.

11. A method, comprising: detecting an incoming communication from a source to a device, wherein the device has been configured to suppress alerts for the incoming call; determining a value indicative of a probability that the incoming communication is responsive to a prior communication to the source, wherein selectively determining the value is based on at least one of: a comparison of a phone number of at least one of the one or more prior outgoing communications to the source and the incoming communication, a comparison of an address of at least one of the one or more prior outgoing communications to the source and the incoming communication, a comparison of a subject line of at least one of the one or more prior outgoing communications to the source and the incoming communication, a comparison of metadata of at least one of the one or more prior outgoing communications to the source and the incoming communication, a number of prior outgoing communications to the source, content similarity between the incoming communication and one or more prior outgoing communications to the source, and a time lapse between the incoming communication and the prior outgoing communication to the source;
determining the value is greater than a specified threshold; and
overriding the alert suppression.

12. The method of claim 11, further comprising generating, based on the probability determination, an alert for the incoming communication.

13. The method of claim 11, wherein the value is based, at least in part, on a number of prior outgoing communications to the source within a specified time period.

14. A device, comprising:
a display; and
one or more processors configured to perform operations comprising:
determining a value indicative of a probability that an incoming communication from a source is responsive to a prior communication to the source, wherein selectively determining the value is based on at least one of: a comparison of a phone number of at least one of the one or more prior outgoing communications to the source and the incoming communication, a comparison of an address of at least one of the one or more prior outgoing communications to the source and the incoming communication, a comparison of a subject line of at least one of the one or more prior outgoing communications to the source and the incoming communication, a comparison of metadata of at least one of the one or more prior outgoing communications to the source and the incoming communication, a number of prior outgoing communications to the source, content similarity between the incoming communication and one or more prior outgoing communications to the source, and a time lapse between the incoming communication and a prior outgoing communication to the source; and
overriding an alert suppression activated on the device when the value is greater than a specified threshold.

* * * * *